US012478893B2

(12) United States Patent
Brennecke et al.

(10) Patent No.: US 12,478,893 B2
(45) Date of Patent: Nov. 25, 2025

(54) DISPLAY BACK PROJECTION APPARATUS, SYSTEM, AND METHOD

(71) Applicant: The Marketing Store Worldwide, LLC, Chicago, IL (US)

(72) Inventors: Grant Brennecke, Chicago, IL (US); King Nang Kenny Lo, Hong Kong (CN)

(73) Assignee: The Marketing Store Worldwide, LLC, Chicago, IL (US)

(*) Notice: Subject to any disclaimer, the term of this patent is extended or adjusted under 35 U.S.C. 154(b) by 991 days.

(21) Appl. No.: 17/205,845

(22) Filed: Mar. 18, 2021

(65) Prior Publication Data

US 2021/0299587 A1 Sep. 30, 2021

Related U.S. Application Data

(60) Provisional application No. 63/000,145, filed on Mar. 26, 2020.

(51) Int. Cl.
*G03B 21/28* (2006.01)
*A63H 33/22* (2006.01)
*G02B 17/08* (2006.01)
*G03B 21/14* (2006.01)
*G03B 21/60* (2014.01)

(52) U.S. Cl.
CPC ............. *A63H 33/22* (2013.01); *G02B 17/08* (2013.01); *G03B 21/28* (2013.01); *A63H 2200/00* (2013.01); *G03B 21/145* (2013.01); *G03B 21/60* (2013.01)

(58) Field of Classification Search
CPC ........ G02B 17/08; G03B 21/28; G03B 21/60; G03B 21/145; G03B 21/14; A63H 3/006; A63H 3/28; A63H 33/22; A63H 2200/00; A63H 3/00
See application file for complete search history.

(56) References Cited

U.S. PATENT DOCUMENTS

| 4,221,459 A | * | 9/1980 | Fisher | G02B 17/0884 |
| | | | | 359/364 |
| 5,642,926 A | * | 7/1997 | Nomura | G03B 21/06 |
| | | | | 353/65 |
| 5,774,201 A | * | 6/1998 | Tackles | G02C 7/02 |
| | | | | 351/44 |

(Continued)

FOREIGN PATENT DOCUMENTS

| BE | 675 140 A | 5/1966 |
| CN | 201 867 578 U | 6/2011 |

(Continued)

OTHER PUBLICATIONS

Peter Zacharia et al., Holes in Clear Lenses Demonstrate a Pinhole Effect, 106 Archives of Ophthalmology 511-513 (1988). (Year: 1988).*

(Continued)

*Primary Examiner* — Jennifer D. Carruth
(74) *Attorney, Agent, or Firm* — Neal, Gerber & Eisenberg LLP

(57) ABSTRACT

An example device for use with an illumination source is disclosed. The device includes a housing, one or more optical elements, and an output surface.

19 Claims, 12 Drawing Sheets

(56) References Cited

U.S. PATENT DOCUMENTS

| | | | | |
|---|---|---|---|---|
| 7,073,913 | B1* | 7/2006 | Wa | G03B 21/28 |
| | | | | 353/62 |
| 7,726,808 | B1* | 6/2010 | Kitchloo | G02C 1/02 |
| | | | | 351/110 |
| 8,353,598 | B2* | 1/2013 | Estevez | G03B 21/28 |
| | | | | 353/39 |
| 9,335,014 | B2* | 5/2016 | Patton | F21S 10/046 |
| 10,183,231 | B1* | 1/2019 | Lowe | A63H 33/22 |
| 2006/0279714 | A1* | 12/2006 | Stahl | G03B 21/2066 |
| | | | | 353/119 |
| 2015/0323160 | A1* | 11/2015 | Duguid | F21V 14/045 |
| | | | | 362/326 |
| 2016/0316184 | A1* | 10/2016 | Kim | H04B 10/40 |
| 2017/0343805 | A1* | 11/2017 | Amaru | B60R 11/02 |
| 2018/0217490 | A1* | 8/2018 | Shin | G02B 27/0101 |
| 2018/0284587 | A1* | 10/2018 | Barnett | H04N 9/3179 |

FOREIGN PATENT DOCUMENTS

| | | |
|---|---|---|
| EP | 2 827 589 A1 | 1/2015 |
| JP | 08-262572 | 10/1996 |
| JP | 2006 262939 A | 10/2006 |
| KR | 2014 0054977 A | 5/2014 |

OTHER PUBLICATIONS

Dongsun Kim et al., Drug Image Retrieval by Shape Color Similarity of the Medication, 2011, pp. 1-4 [online], [retrieved Jan. 8, 2024], retrieved from the Internet <URL: https://www.researchgate.net/publication/252019234_Drug_Image_Retrieval_by_Shape_and_Color_Similarity_of_the_Medication>. (Year: 2011).*

Ethan Siegel, Why Do Telescopes Have Holes in the Middle?, 2016, pp. 1-7 [online], [retrieved Jan. 11, 2024], retrieved from the Internet <URL: https://www.forbes.com/sites/startswithabang/2016/02/08/why-do-telescopes-have-holes-in-the-middle/?sh=259fc479123a>. (Year: 2016).*

Aperture Plates, 2017, pp. 1-2 [online], [retrieved Jan. 10, 2024], retrieved from the Internet <URL: https://web.archive.org/web/20180815045110/https://www.sprocketschool.org/wiki/Aperture_plates>. (Year: 2017).*

Plano-Convex Lenses, 2019, one page [online], [retrieved Jan. 8, 2024], retrieved from the Internet <URL: https://web.archive.org/web/20190828102332/https://www.newport.com/c/plano-convex-lenses>. (Year: 2019).*

Patent Translate Machine English Translation of CN 201867578 U filed with CN 201867578 U and Espacenet Bibliographic Data for CN 201867758 U. (Year: 2024).*

Patent Translate Machine English Translation of JP 2006-262939 A filed with JP 2006-262939 A and Espacenet Bibliographic Data for JP 2006-262939 A. (Year: 2024).*

Alexandru Dancu et al., Smart Flashlight: Map Navigation Using a Bike-mounted Projector, 2014, pp. 3627-3630 [online], [retrieved 2024-07001], retrieved from the Internet <URL: https://dl.acm.org/doi/pdf/10.1145/2556288.2557289>. (Year: 2014).*

Smartphone Projector Instruction Manual, 2018, one page [online], [retrieved Jul. 1, 2024], retrieved from the Internet <URL: https://www.thesource.ca/download/EN/108069238_Manual.pdf>. (Year: 2018).*

Portable Digital Multi-Media/Audio Projector, 2007, pp. 1-13 [online], [retrieved Oct. 19, 2024], retrieved from the Internet <URL: https://priorart.ip.com/IPCOM/000159255>. (Year: 2007).*

Roland Ryf et al., The Alcatel-Lucent Microprojector: What Every Cell Phone Needs, 14 Bell Labs Technical Journal 99-112 (2009). (Year: 2009).*

Markus Lochtefeld et al., Marauders Light: Replacing the Wand with a Mobile Camera Projector Unit, 2009, pp. 1-4 (online), [retrieved Oct. 18, 2024], retrieved from the Internet <URL: https://dl.acm.org/doi/pdf/10.1145/1658550.1658569>. (Year: 2009).*

Kenneth Li, 14.2: Waveguide-Based Pico-Projector with Only One Lens for Cell-Phone Applications, SID 09 Digest 166-167 (2009). (Year: 2009).*

Lisa G. Cowan et al., Projector Phone Use: Practices and Social Implications, 16 Pers Ubiquit Comput 53-63 (2012). (Year: 2012).*

International Search Report and Written Opinion for International Application No. PCT/US2021/024144 dated Jun. 29, 2021.

* cited by examiner

DISPLAY BACK PROJECTION APPARATUS, SYSTEM, AND METHOD

CROSS-REFERENCE TO RELATED APPLICATIONS

This application claims the benefit of and priority to U.S. Provisional Patent Application No. 63/000,145, filed Mar. 26, 2020 which is incorporated herein by reference in its entirety.

TECHNICAL FIELD

The present disclosure generally relates to an apparatus, system, and method relating to a toy that may be illuminated and used in connection with a digital experience without the need for electronics or batteries inside the toy.

BACKGROUND

Consumers, particularly children, are increasingly interested in toys that include lights, sounds, other electronics, and are interactive with the user. Typically this means that the toy must include electronics, as well as batteries or some other power source (i.e., a wire to plug into an outlet) in order to operate. The users can interact with the toy either via their voices, or via a touch interface.

SUMMARY

The present disclosure summarizes aspects of some embodiments, and should not be used to limit the scope of the full disclosure. Other implementations are contemplated in accordance with the techniques described herein, as will be apparent to one having ordinary skill in the art upon examination of the following drawings and detailed description, and these implementations are intended to be within the scope of this application.

Various embodiments are disclosed herein in the context of a toy including a housing and various optical elements, which enable the toy to be positioned on an electronic device such as a phone or tablet, and project an image onto a surface of the housing. The toy does not require dedicated electronics or a power source.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1B:
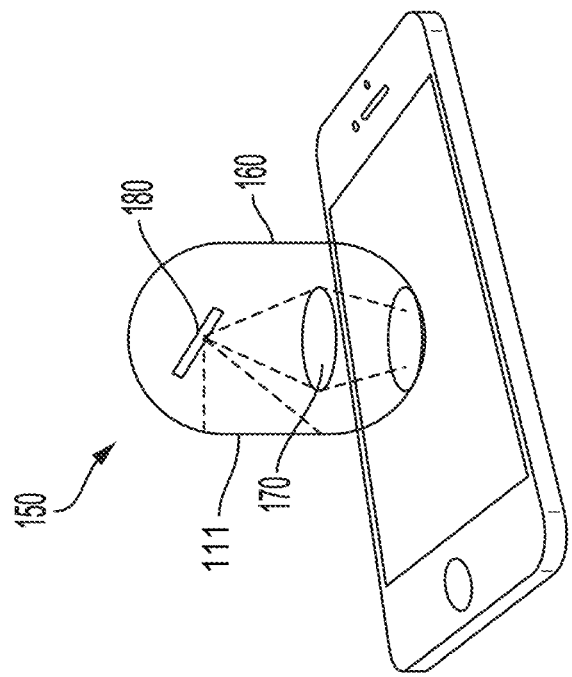
FIGS. 1A and 1B illustrate two embodiments of the device of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above toys that are interactive and include sound and electronics are often preferred by consumers, especially children. These toys, however, typically require independent electronics and power sources either included in the toy, or the toy includes a wire to be plugged into an outlet or other power source. This can increase the complexity of the toy, increase the modes of failure, increase safety concerns, and increase manufacturing complexity and costs, among other things.

The devices of the present disclosure may provide a toy that enables an interactive experience for a user, without the need for integrated electronics or a power source. The toy may be used in combination with a smart phone, tablet, or other display device to create an immersive experience for a user, while maintaining the benefits of relatively easy and inexpensive manufacturing, simplicity of design, improved safety, and more.

An object of the present disclosure may be to provide a user with unique functionality and a digital experience, without the need for electronics or batteries included in the toy itself.

A further object of the present disclosure may be to provide a toy with illuminated features, such as animated face or other animations projected to the surface of the toy, without the need for electronics or batteries inside the toy.

A further object of the present disclosure may be to provide a user an experience combining a physical toy with a digital experience, which can include visual animated effects and/or audio effects.

A further object of the present disclosure may be to provide a toy that can project a digital image from a tablet and/or smart phone display to a translucent panel on the surface of the toy with illuminated features, animations or other components without the need for electronics or batteries inside the toy, wherein the toy may be formed from injection molded and assembled parts.

A further object of the present disclosure may be to provide a toy with features that may be used to show backlighted images or animations from a smartphone, tablet, or other such light source or display.

A further object of the present disclosure may be to provide software that will allow interaction between a smartphone, tablet, or other display device and a toy according to the present disclosure.

With these goals in mind, an example device or toy of the present disclosure may be configured to operate in combination with an illumination source such as a smart phone, tablet computer, or other illuminated display. The toy may interact with the illumination source to display digital images, animations, text, and other graphics in a semi three dimensional manner. The toy may include a curved surface, which may be configured to display the two dimensional image output by the illumination source.

In the illustrated examples, the device includes a housing, optics, and an output surface.

Figure 5A:
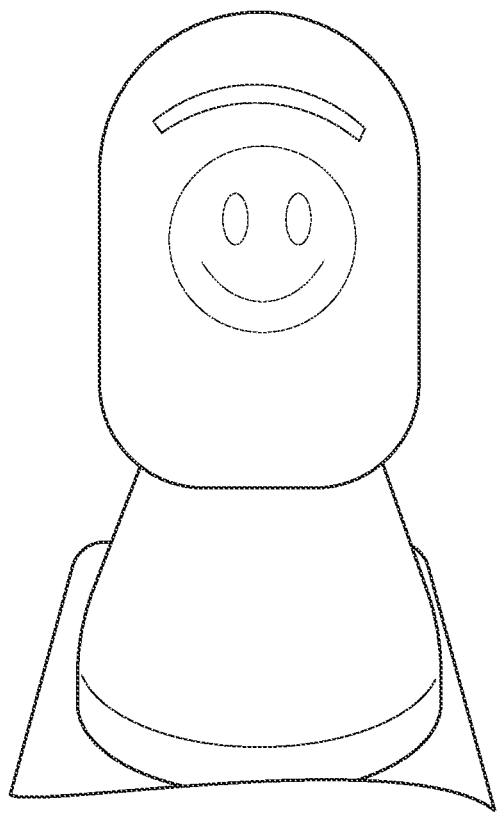
FIGS. 5A, 5B, and 5C illustrate example devices positioned on a smart phone, according to embodiments of the present disclosure.

The housing may come in various forms. As shown in FIGS. 1A, 1B, 5A, 5B, 5C, 6, and 7 in particular, the housing may be generally pill-shaped, or cylindrical with a rounded top and bottom. The housing may include a major axis (or long axis) and a minor axis (or short axis), which may correspond to the major and minor axis of the device. In some examples, the housing may include a conical frustum on a bottom end of the cylindrical or pill-shaped top portion, as is shown in FIGS. 1A and 5A. It should be appreciated that other shapes may be used as well.

The housing may be configured to engage with and hold the optics (described in further detail below). Furthermore, the housing may define the output surface. The housing may also enable the device to stand flatly and securely on the illumination source. In some examples, the housing may be made from plastic or another relatively soft material.

Figure 2:
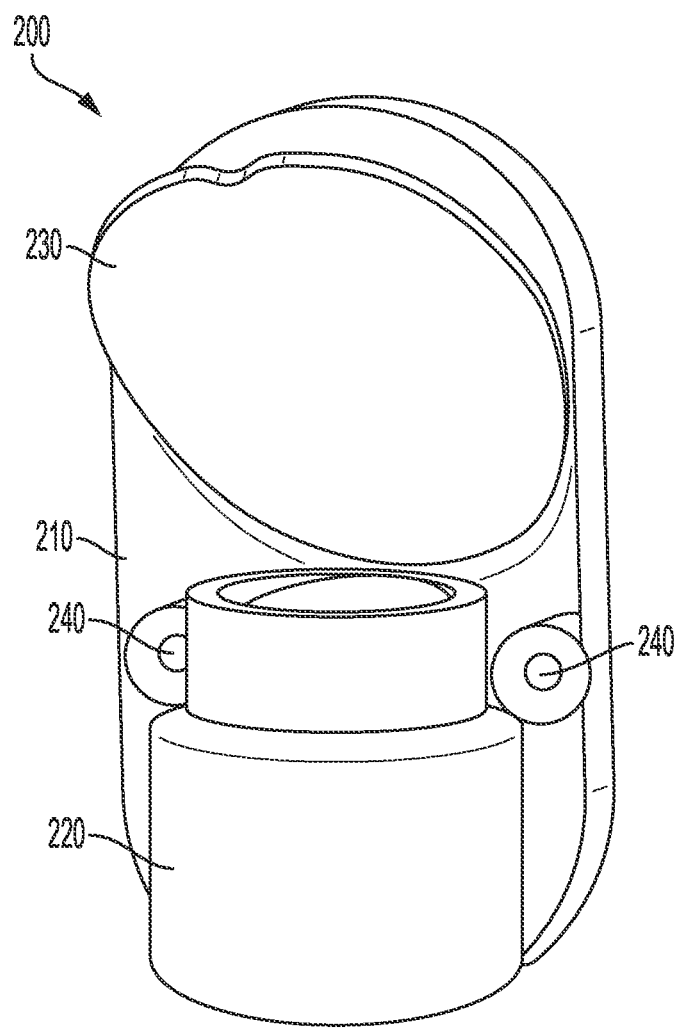
FIG. 2 illustrates an interior view of an example device of the present disclosure, showing the optical elements in a first section of the housing.
Figure 3:
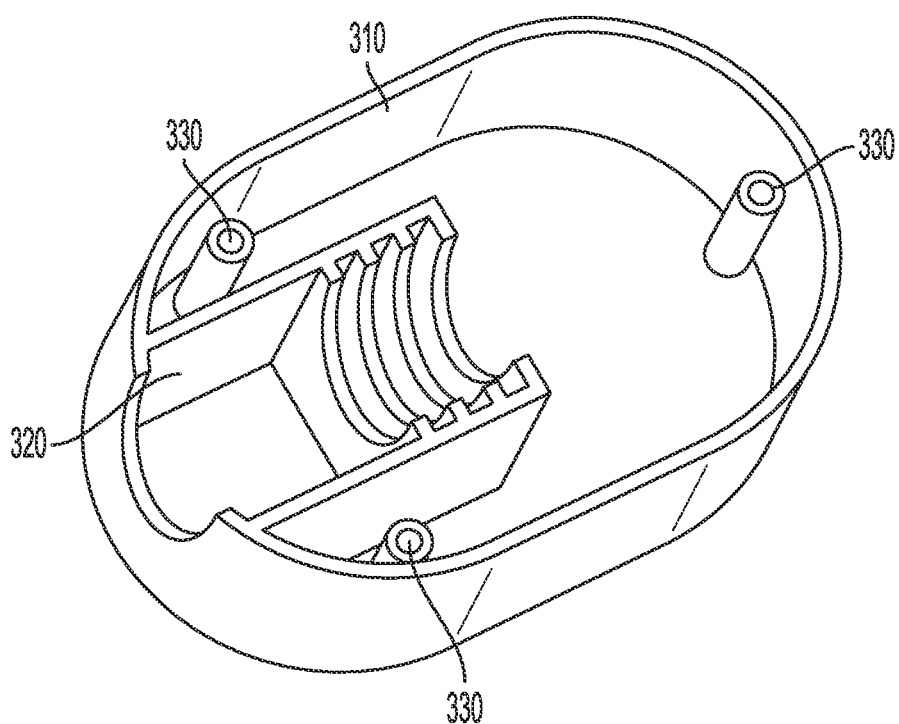
FIG. 3 illustrates an example housing section according to embodiments of the present disclosure.

In some examples, the housing may be comprised of one or more sections or components. For example, the housing may be comprised of two sections which split the device from top to bottom (i.e., generally vertically when the device is placed upright). This is illustrated in FIGS. 2 and 3, which each illustrate one section of the housing, with FIG. 2 also illustrating example optical elements. In some examples, the sections of the housing are formed by, for example, injection molding, casting, stamping, or rotational molding.

In some examples, such as those shown in the Figures, the housing may form a geometric shape. In other examples, the housing may form the shape of a figurine, a vehicle, an animal, or some other object.

FIG. 1A illustrates a first embodiment of a device 100. The device 100 includes a housing 110, which includes a bottom portion 112 and a top portion 114. The bottom portion 112 is a conical frustum shape, including a wider bottom than top. The bottom portion 112 may be open on the top and bottom, or may include a top or bottom surface (such that the bottom portion 112 is "closed" on either or both of the top and bottom ends. The bottom portion 112 may be hollow on the inside, to allow light from the illumination source to pass from the bottom end of the bottom portion 112 to the top end. In some examples, the bottom portion 112 is configured to connect to, engage with, and support the top portion 114.

The top portion 114 of the device 100 is illustrated as a pill-shaped or generally cylindrical shaped portion. In some examples, the top portion 114 may be formed at the same time as the bottom portion 112, such that they are of unitary construction. In other examples, the top portion 114 may be independently formed from the bottom portion 112, and/or may be separable from the top portion 114.

Figure 1A:
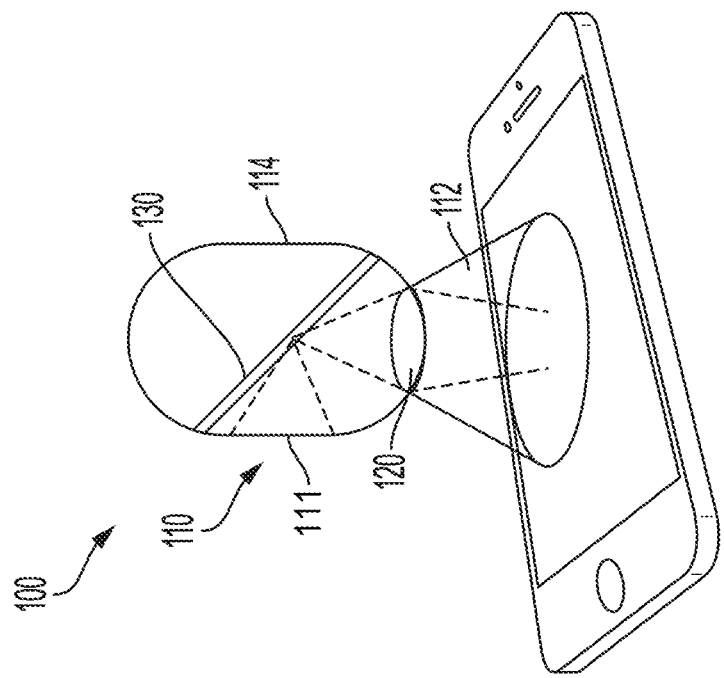

FIG. 1B illustrates a second embodiment, wherein the device 150 includes a single housing portion 160. The housing 160 may be similar or identical in shape to the top portion 114 shown in FIG. 1A. A bottom end of the housing 160 may be open, such that light from the illumination device can pass through the opening in the housing 160 to be received by the optics.

The device or toy of the present disclosure also includes one or more optical elements. The optical elements may operate in connection with the housing such that the optical element(s) receive light from a light source incident on one surface of the housing, and transmit the light to a mirror that will in turn reflect the image onto the inside surface of an output surface (e.g., a translucent housing screen). In some examples, the optical elements may be configured to receive light from the illumination source, act on the received light (e.g., collimate, distort, align, or otherwise perform some optical function), and cause the resulting image to be displayed on the output surface of the device.

In some examples, the device may include a collector portion, a lens, and a mirror.

The collector portion (e.g., a collection surface), may be located proximate to any portion of the housing. In one embodiment, the collector portion is located within the lower portion, base, or feet of the device facing downward when the device is positioned upright on its base. The collector portion may be an opening defined by the housing, through which light from the illumination source passes so that it can illuminate the optical elements positioned in the housing.

The optical elements may also include one or more lenses. In one example, the lens may transmit light from the illumination source incident on the bottom of the housing through the interior of the housing and onto another optical element such as a mirror, or onto an inner surface of the housing.

In some examples, the lens may be positioned on a top of the bottom portion 112 of the housing, and/or a bottom of the top portion 114. This is shown in FIG. 1A, wherein the lens 120 is positioned at the intersection between the bottom portion 112 and the top portion 114.

In some examples, the lens may be positioned within the top portion of the housing, particularly where there is no bottom portion of the housing. This is illustrated in FIG. 1B, wherein the lens 170 is positioned inside the housing 160.

The optical elements may also include one or more mirrors. The mirror may be positioned inside the housing, such that light from the lens is reflected onto the output surface. For example, the mirror may be positioned at the top of the housing, at a middle of the housing, or at some other location. The mirror may be positioned such that light from the illumination source must pass through the lens or another optical element before it reaches the mirror.

In some examples, the mirror may be flat. In other examples, the mirror may be curved in one or more directions, or may include a geometric shape or curve other than being flat.

FIG. 1A illustrates a mirror 130, positioned above the lens 120, and configured to reflect light onto the output surface 111 of the device 100. FIG. 1B illustrates a second embodiment, wherein a mirror 180 is configured to reflect light onto an output surface 111 of the device 150.

In some examples, the distance between the lens and the mirror, between the lens and the illumination source, and between the mirror and the illumination source may be set or determined based on a desired focal length. When an image is displayed on the illumination source (e.g., phone or tablet screen), it may be desirable for the focal distance to remain fixed, such that the image can be displayed in focus on the output surface. If the distance is variable or not within a desired range, the image may be displayed out of focus.

However, in some examples it may be desirable to vary the position of the lens and or mirror with respect to the illumination source. This may be desirable particularly where the illumination source displays an out of focus image, or an animation. The focal distance between the illumination source and the output surface may be variable to compensate for the changing image or animation, or to produce one or more visual effects on the output surface.

The device may also include an output surface on which the image is displayed. The output surface may comprise a surface with a corresponding surface area. The output surface may take on many different shapes including a circular shape, an elliptical shape, or a polygonal shape. In addition, the output surface may be flat or two dimensional, or may form a three-dimensional shape such as convex, concave, smooth, contoured, or include bends or other features. In one embodiment, the output surface comprises a smooth surface (which may be curved) without any bends or other features. In one embodiment, a smooth surface (which may be curved) without any bends or other features allows for a more uniform light distribution across the output surface.

In some examples, the output surface may be a single continuous surface. In other examples, the output surface may include two or more surfaces positioned proximate each other, or positioned apart from each other.

In some examples, the output surface may be a portion of the housing that is translucent, or partially transparent. The output surface may be clear and frosted, or have some other coating or treatment applied. The output surface must be opaque enough to 'catch' the image, while also being transparent enough to show the image through to the outside of the device.

The output surface may be aligned with the mirror, such that the light reflected by the mirror illuminates a middle of the output surface.

In one embodiment, the output surface may be positioned such that it corresponds to a feature of the device (e.g., a face of the device where the device is a toy). Features may include the eyes, face, or other aspect of a character, the details of a costume of the toy, another accessory of the toy, or any other suitable feature.

The housing and optical elements (e.g., lens and mirror) may be assembled by any known techniques including mechanical connections such as a snap fit or a pressure fit, or by use of glue, rivets, screws, ribbing, or other fastener materials. FIGS. 2 and 3 illustrate example housing sections and some optical elements positioned within the housing. FIG. 2 illustrates a device 200 having a housing 210 a lens 220 positioned in a secondary lens housing which is separate from the housing 210, and a mirror 230. Housing 210 also defines a plurality of apertures 240 which may be configured to secure the illustrated portion of the housing 210 to a corresponding second section to form a complete housing.

FIG. 3 illustrates a housing section 310 which includes a lens reception section 320. The lens reception section 320 is configured to receive one or more lenses (not shown). The lens reception section 320 is formed as part of the housing 310, such that they form a single unit. The housing 310 also includes a plurality of apertures 330 which may be configured to secure the illustrated portion of the housing 310 to a corresponding second section to form a complete housing.

The device of the present disclosure may be configured to operate in connection with a light illumination source, such as a smartphone, tablet, computer, or other illuminated display. In some examples, the source image or video output by the illumination source must be illuminated.

In some examples, the illumination source including the display is programmed to emit light from a display of the illumination source. The light may be any color, intensity, or brightness permitted by the display hardware and software. The light may further be emitted in any shape on the surface of the display. The light emitted by the display may be constant in intensity or color, or the light may change, adjust, dim, shimmer, or shift color.

In some examples, the illumination source may be configured to display animated digital images, still images, and various other digital images.

Figure 4:
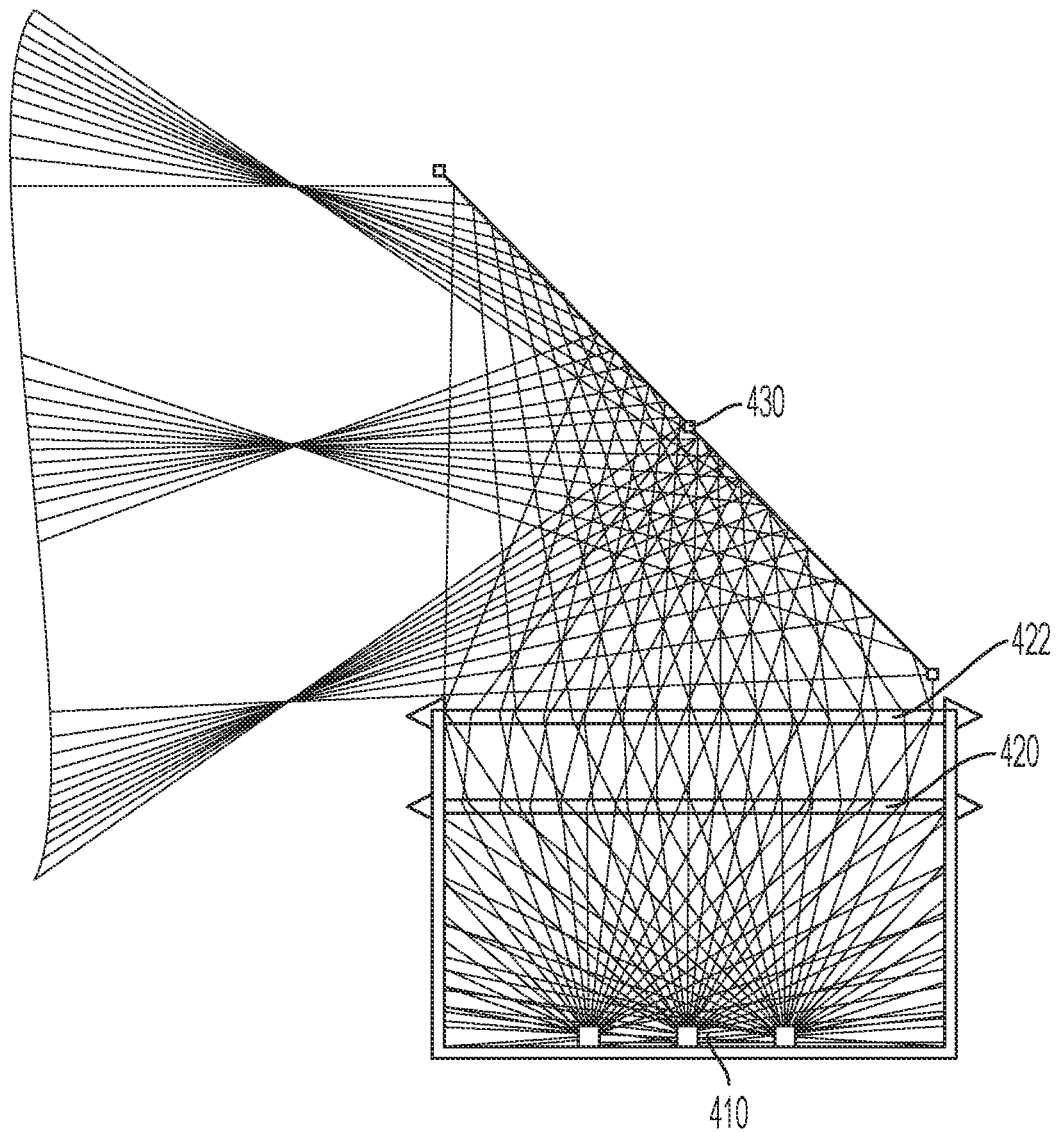
FIG. 4 illustrates an example arrangement of optical elements and light paths according to embodiments of the present disclosure.

FIG. 4 illustrates the path light may take in an example device of the present disclosure. FIG. 4 illustrates an illumination source 410, a first lens 420, a second lens 422, and a mirror 430. The lenses 420 and 422 and the mirror 430 may be positioned spaced apart from each other, and at particular distances from the illumination source such that the light emanating from the illumination source 410 reaches the focal point at a particular distance laterally from the mirror 430. This enables the output surface to be positioned appropriately such that the resulting image is displayed on the output surface in focus.

Figure 5B:
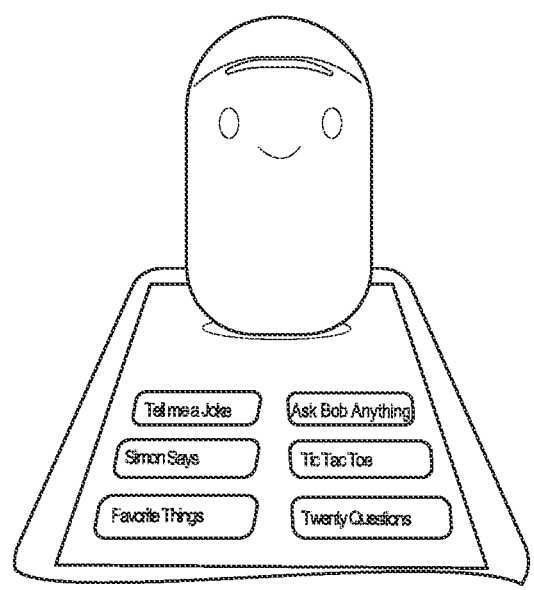
Figure 5C:
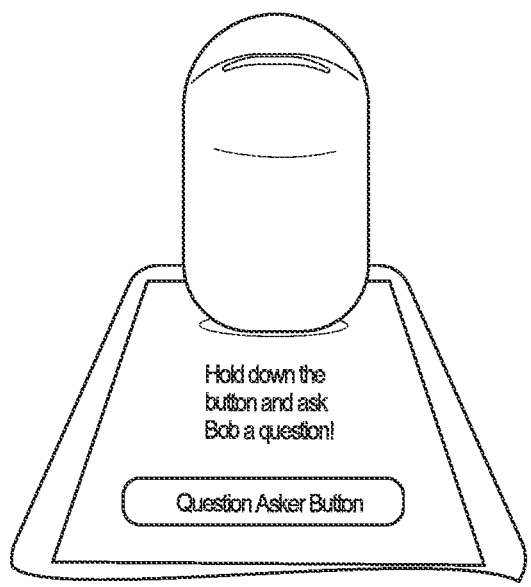

FIGS. 5A, 5B, and 5C illustrate example devices displaying images from illumination sources. FIG. 5A illustrates an anthropomorphic character. The device of FIG. 5A is the same as the device illustrated in FIG. 1A, including the bottom portion and the top portion of the housing. FIGS. 5B and 5C illustrate a second example device in two states. FIG. 5B illustrates an anthropomorphic character, "Bob" with which the user can interact. The illumination source or phone displays icons which enable the user to select various different ways of interacting with "Bob" FIG. 5C illustrates additional functionality, wherein the use can ask a question that "Bob" will attempt to answer.

In some examples, the shapes corresponding to the collector portions or lower portions of the housing that receive the light from the illumination source may emit light effects such as a changing color, flashing, strobe effects, and changes in intensity.

In some examples, the illumination source may be programmed to display an outline of the base of the housing of one or more toys to allow a user to properly position the toy on the surface of the illumination source. In one example, the user may then press a virtual button on the display, or an actual button on the device, and the display may emit light corresponding to the area of the collector portion or lower portion of the housing. In another example, the illumination source may already be emitting animated images corresponding to the area of the collector portion or lower portion of the housing when the toy is placed on the illumination source. In either event, when the toy is properly placed on the illumination source corresponding to the outline of the toy, the light travels through the lens to the mirror, and the reflected images are projected and displayed on the translucent output surface of the toy.

In some examples, the illumination source is programmed to output one or more sounds such as music, dialog, and/or sound effects in conjunction with the light effects. In some examples, the illumination source is programmed to display images upon activation. In some examples, the illumination source is programmed to choreograph or coordinate the sounds and emitted light such as for a light show or to illustrate a story or a scene including the toy.

In some examples, the illumination source may be programmed to illustrate a story or one or more scenes. For instance, the illumination source may prompt the user to place one or more toys on one or more portions of the display and press an activation button. Upon pressing of the activation button, the illumination source may output sounds and lights corresponding to a scene, where the digital images are transmitted through the toy via the lens and mirror to create light effects on the toy. When the scene is complete, the illumination source may prompt the user to adjust the one or more toys on the display or place different toys on the display and press an activation button. Upon pressing the activation button, the illumination source may output sounds and backlit projection corresponding to a different scene.

In some examples, the illumination source is programmed to allow the user to program their own light and/or sound output according to user preference. In one embodiment, the illumination source may be programmed with pre-existing options for images/light and/or sound output which may be adjusted according to user preference.

In some examples, the illumination source may be configured to sense a toy or its position on or in proximity to a display including, for instance, by using the capacitive touch capabilities of a device. In another embodiment, a device is not configured to sense a toy or its position on or in proximity to a display, and the toy does not include capacitive touch materials and/or capabilities. In some examples, the display by a light source is independent from the positioning of the device, such that the position of the display device does not affect the position of an image on a display of the light source.

Figure 6:
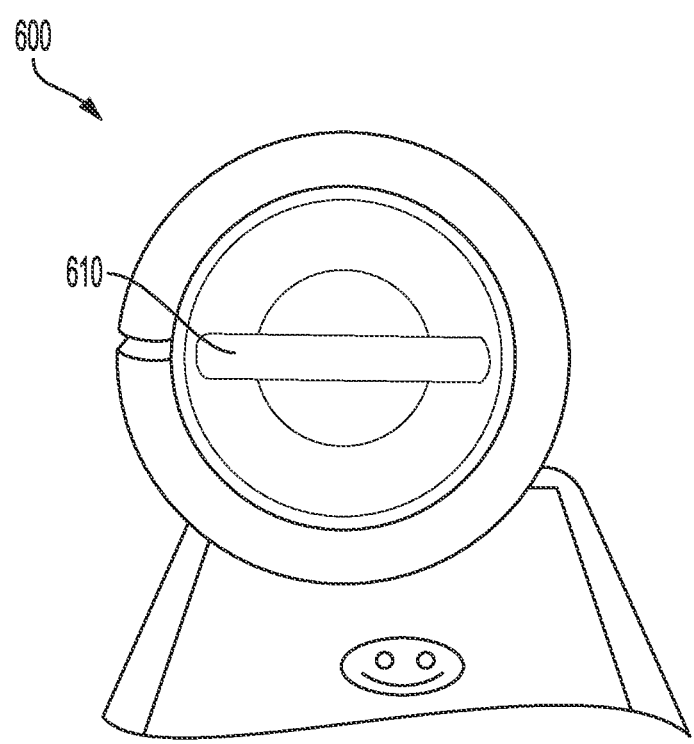
FIG. 6 illustrates a bottom view of an example device, illustrating an obstructive element spanning across the inside of the housing.
Figure 7:
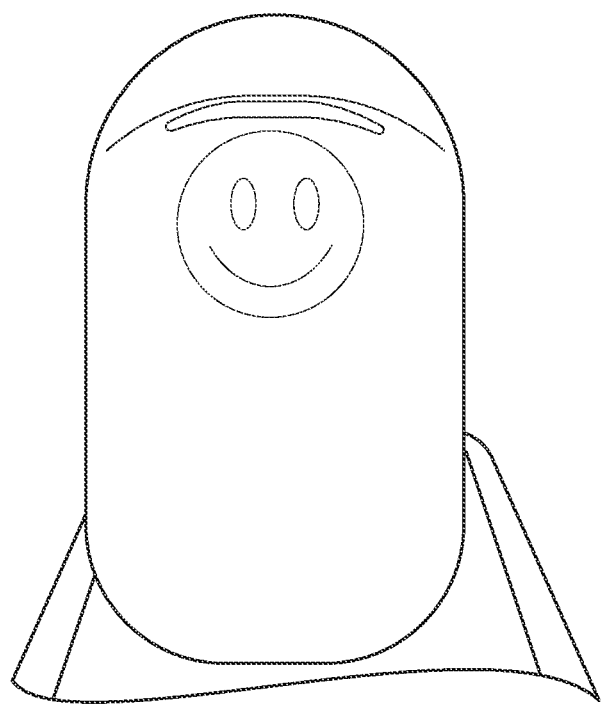
FIG. 7 illustrates the device of FIG. 6 on a display device, showing that the obstructive element does not significantly impact the output.

FIGS. 6 and 7 illustrate that the device of the present disclosure may include an obstructive element in the pathway of the light between the illumination source and the output surface, without significantly impacting the resulting imaged displayed. FIG. 6 illustrates a bottom view of an example device 600, wherein an obstructive element 610 is positioned inside the housing, in the path of the light. The obstructive element 610 may be an axle or other mechanical component used for a "wind-up" movement, or other movement of a toy. The obstructive element 610 can pass through the path of the light inside the housing without significantly reducing the output image quality. FIG. 7 illustrates the resulting output image when the path of light is partially obstructed by the obstructive element 610.

FIGS. 8, 9A-C, and 10A-C illustrate aspects of another embodiment of the device of the present disclosure. The device 1000 may be similar or identical to the devices 100 and 150 illustrated and described above with respect to FIGS. 1-7.

Figure 8:
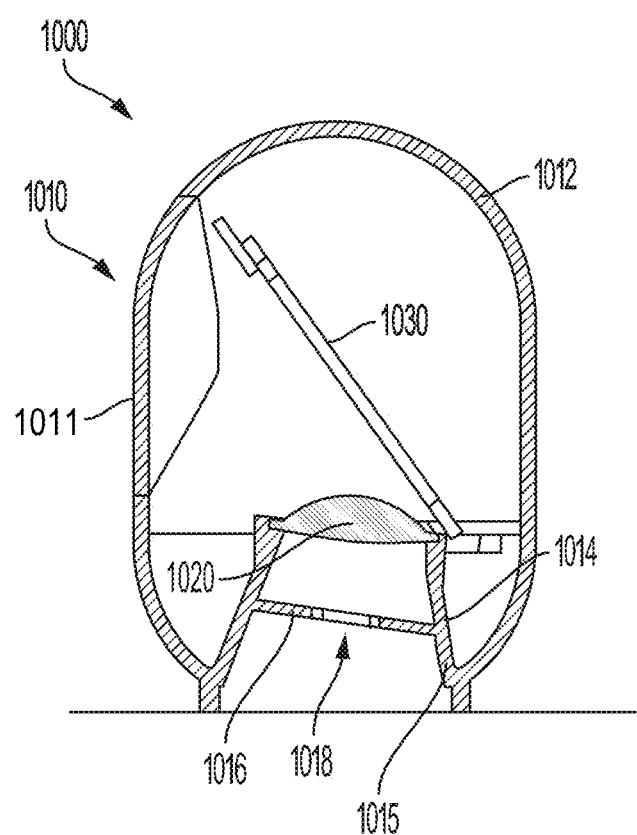
FIG. 8 illustrates a cross-sectional view of a third embodiment of the device of the present disclosure.

In the illustrated embodiment of FIG. 8, the device 1000 includes a housing 1010, a lens 1020, and a reflector or mirror 1030.

The housing 1010 may be similar or identical to the housing 110 and/or 160 described above. The housing 1010 may be configured to support one or more internal elements, such as the lens 1020 and the reflector 1030. The size, shape, and spacing between various components or parts of the housing 1010 may be configured in order to maintain correct distances between one or more optical elements, the light source, and the display surface of the device. These distances, along with the shape and characteristics of the optical elements (e.g., the lens 1020 and the mirror 1030) ensures that the resulting image displayed on the inner surface of the housing 1010 is in focus. The device 1000 and the housing 1010 may include major axes and minor axes, which correspond to the long and short axis of the device 1000 and housing 1010.

In the example shown in FIG. 8, the housing 1010 includes a first portion or top portion 1012, and a second portion or bottom portion 1014. The top portion 1012 is generally pill shaped, or cylindrically shaped, with curved ends. The top portion 1012 may be made of a semi-transparent or transparent material and includes an output surface 1011 of the device 1000, such that an image projected onto the inner surface of the top portion 1012 can be viewed from the outside.

The bottom portion 1014 may be configured to engage a surface on which the device 1000 is placed, as well as to support the various optical elements inside the housing 1010. The bottom portion 1014 of the housing may be configured to engage a surface of a light or image source, such as a smartphone, tablet, or other light emitting device. The bottom portion 1014 may include an opening that is cylindrical, matching the overall shape of the housing 1010 when viewed from above. It should be understood that other shapes may be used as well, such as square, rectangular, oval, and more. The shape of the bottom opening of the bottom portion of the housing 1014 may also be different from, or not match, the overall shape of the housing 1010. For instance, the top portion of the housing 1012 may be pill shaped as shown in FIG. 8, while the opening of the bottom portion 1014 has a rectangular or square shape.

The bottom portion of the housing 1014 may be connected to the top portion 1012, and may be configured to support the top portion 1012 and/or one or more of the optical elements of the device. Furthermore, the bottom portion 1014 may be used to support the device 1000 when it is positioned on a light source device. As noted above, in some example the light source device may use capacitive sensors or other touch-based or proximity-based sensors to detect the presence of the device 1000, in order to begin displaying an image. In some examples, however, the position of the image on the display device may be set, and a user may be required to position the device 1000 in the appropriate location in order for the image to be displayed by the device 1000 in focus.

The bottom portion of the housing 1014 may include an upwardly extending wall 1015, which extends upwardly into the interior of the top portion of the housing 1012. A bottom end of the upwardly extending wall 1015 may be configured to engage a surface on which the device 1000 is place. The shape of the upwardly extending wall 1015 may be such that it matches the shape of the lower opening of the bottom portion of the housing 1014 (e.g., cylindrical as shown in FIG. 8). Alternatively, the upwardly extending wall may have a different shape. In some examples, the upwardly extending wall 1015 defines the shape of the opening, as in FIG. 8. In other examples, the shape of the opening may be different from the shape of the upwardly extending wall 1015.

The bottom portion of the housing 1014 may also include a lateral member 1016, having an aperture 1018 positioned in a middle or central location of the lateral member 1016. The aperture 1018 may be configured to improve the resulting quality of the image displayed by the device, my preventing light from the sides, or from oblique angles from passing through onto the lens 1020.

The bottom portion of the housing 1014 may also be configured to support the lens 1020. The lens 1020 may be friction fitted in place, held in place via one or more fasteners, or held in place by the bottom portion of the housing 1012 in some other manner. The lens 1020 may include a major axis and a minor axis. The major axis may be the axis generally parallel to the length of the lens 1020.

The minor axis may be transverse or transverse to the major axis, and may be transverse to the direction at which light enters the lens 1020.

In some examples, the distances between (1) the lens 1020 and the light source on which the device 1000 is placed, (2) the lens 1020 and the aperture 1018, and (3) the aperture 108 and the light source on which the device 1000 is placed may be predetermined in order to ensure that the resulting image displayed on the inner surface of the housing 1010 is in focus. These distances, in combination with the parameters of the lens 1020 and mirror 1030, ensure that the resulting image displayed is in focus (i.e., the device has a particular focal length). For instance, increasing the distance from the lens to the light source may enable the lens to have less curvature, while still providing the same quality of resulting image.

In some examples, along with the distances noted above, the orientation of the lens 1020 and mirror 1030 impacts the focal length. For instance, a lens having a relatively longer focal length may be used and positioned at an angle with respect to the light source surface (i.e., as shown in FIG. 8). This enables the light to travel along a relatively longer path before reaching the inner surface of the housing 1010, thereby enabling the image to be in focus using a lens having a relatively longer focal length (i.e., a "weaker" lens). Alternatively, the lens 1020 may be positioned parallel to the light source surface, thereby decreasing the distance that the light travels before reaching the inner surface of the housing 1010. In this example, the lens 1020 may have a relatively shorter focal length (i.e., a "stronger" lens) compared to the previous example, to compensate for the reduced travel distance of the light.

The device 1000 also includes a reflector 1030, which may be a mirror. The reflector 1030 may be flat, curved, concave, convex, and/or may have a non-uniform or asymmetric shape. The reflector 1030 may be similar or identical to reflectors 130 and/or 180 described above.

Figure 9A:
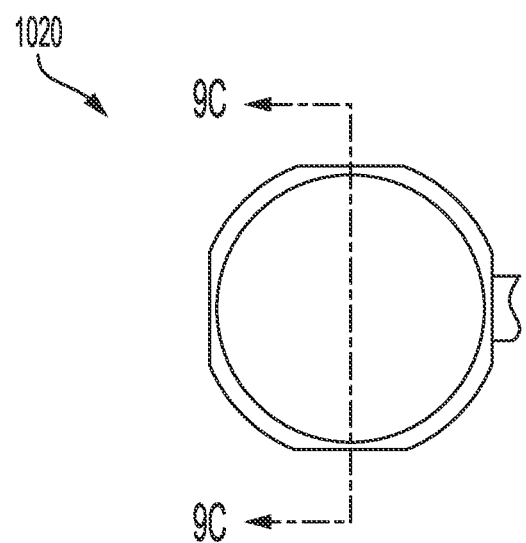
FIGS. 9A-C illustrate top, side, and cross-sectional views of a first example lens of the device of FIG. 8.
Figure 9B:
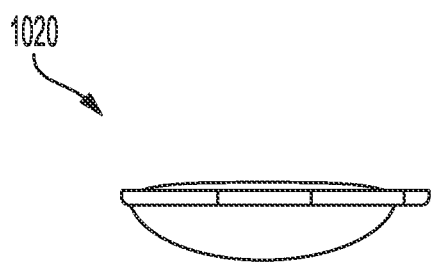
Figure 9C:
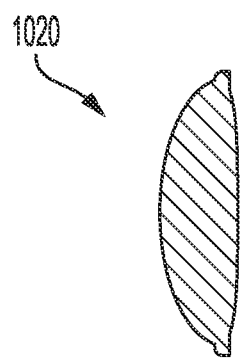

FIGS. 9A-C illustrate three views of the lens 1020 of FIG. 8. As shown, the lens 1020 is generally circular in shape, and has four flattened edges. The four flattened edges may enable the lens 1020 to be more easily inserted and held in place in the device 1000. These four flattened edges may assist with placement of the lens in the correct orientation. The lens 1020 also includes concave upper and lower surfaces.

Figure 10A:
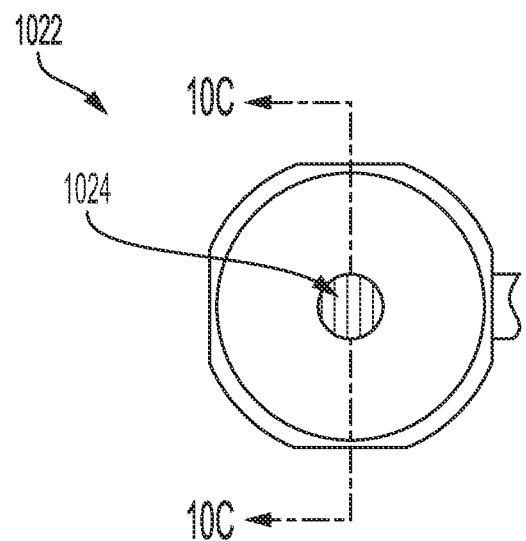
FIGS. 10A-C illustrate top, side, and cross-sectional views of a second example lens of the device of FIG. 8.
Figure 10B:
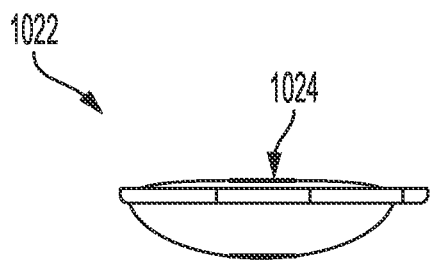
Figure 10C:
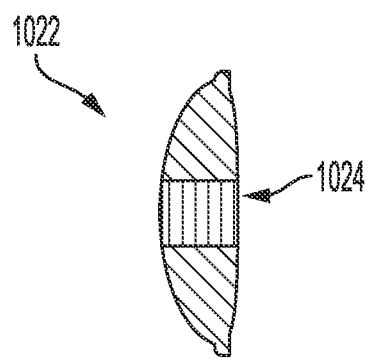

FIGS. 10A-C illustrate three views of a second example lens 1022, which may be used in place of the lens 1020. The lens 1022 may be similar or identical to the lens 1020 in one or more respects, but with a cylindrical bore 1024 in the center. The size and shape of this bore 1024 may vary. For instance, the bore 1024 may have a diameter that is greater or smaller than that shown in FIGS. 10A-C. In some examples, a diameter of the bore 1024 is less than half of the diameter of the lens 1022. The bore 1024 may reduce the material of the lens 1022 to reduce the overall weight. The bore 1024 may also enable a relatively stronger lens to be made using the same general footprint or size of lens. While the bore 1024 is illustrated as a cylindrical bore, it should be appreciated that other shapes may be used as well, including rectangular, conical, and more.

In some embodiments described above, the device includes a mirror positioned at an angle, to enable light to be reflected onto the inner surface of the housing. It should be appreciated that in some embodiments, the device may include two or more mirrors or reflectors, or may include no mirror or reflector at all.

The above description of the disclosed embodiments and examples is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent embodiments of the invention and are therefore representative of the subject matter which is broadly contemplated by the present invention. It is further understood that the scope of the present invention fully encompasses other embodiments that may become obvious to those skilled in the art.

The invention claimed is:

1. A device comprising:
    a single housing configured to be placed on a display screen of a mobile device, wherein the single housing comprises:
        a first housing section including a first portion of a lens reception section;
        a second housing section including a second portion of the lens reception section;
        a bottom member formed when the second housing section is secured to the first housing section and defining an opening through which light emitted by the display screen travels when the single housing is placed on the display screen; and
        an output surface;
    a lens affixed to the lens reception section inside the single housing, wherein the lens is configured to receive and concentrate the light when the single housing is placed on the display screen; and
    a mirror affixed inside the single housing and spaced apart from the lens by a fixed distance, wherein the lens is positioned between the mirror and the opening such that the mirror is configured to reflect the light that is concentrated by the lens onto the output surface of the single housing to form an image.

2. The device of claim 1, wherein the lens is affixed to the lens reception section of the single housing such that a major axis of the lens is parallel to a plane defined by the bottom member of the single housing such that the major axis of the lens is configured to be parallel to the display screen when the bottom member is rested on the display screen.

3. The device of claim 1, wherein the lens is affixed to the lens reception section of the single housing such that a major axis of the lens is at an acute angle with respect to a plane defined by the bottom member of the single housing such that the major axis of the lens is at an acute angle with respect to the display screen when the bottom member is rested on the display screen.

4. The device of claim 1, wherein the bottom member of the single housing is conical such that a first end of the bottom member that is configured to engage the display screen has a larger diameter than a second end of the bottom member.

5. The device of claim 1, wherein the single housing has a pill or cylindrical shape.

6. The device of claim 1, wherein the output surface of the single housing is semi-transparent.

7. The device of claim 1, wherein the first housing section and the second housing section of the housing are attachable using a fastener.

8. A device for displaying a projected image comprising:
    a single housing configured to be placed on a display screen of a mobile device, wherein the single housing comprises:

a first housing section including:
   a first portion of an upwardly extending wall, and
   a first portion of a lateral member;
a second housing section including:
   a second portion of the upwardly extending wall, and
   a second portion of the lateral member;
a top portion formed when the second housing section is secured to the first housing section and having an output surface; and
a bottom portion formed when the second housing section is secured to the first housing section and comprising:
   the upwardly extending wall having a first end configured to engage the display screen when the single housing is placed on the display screen, wherein the upwardly extending wall defines an opening through which light emitted by the display screen travels when the bottom portion is placed on the display screen; and
   the lateral member extending inward from the upwardly extending wall, wherein the lateral member defines an aperture through which the light emitted by the display screen travels when the bottom portion is placed on the display screen;
a lens affixed to the upwardly extending wall inside the single housing, wherein the lens is configured to receive and concentrate the light when the single housing is placed on the display screen; and
a mirror affixed inside the single housing and spaced apart from the lens by a fixed distance, wherein the lens is positioned between the mirror and the opening such that the mirror is configured to reflect the light that is concentrated by the lens onto the output surface of the single housing to form an image.

9. The device of claim 8, wherein the lens is affixed to the upwardly extending wall of the bottom portion of the single housing such that a major axis of the lens is at an acute angle with respect to a plane defined by engagement of the upwardly extending wall with the display screen when the bottom portion is rested on the display screen.

10. The device of claim 8, wherein the aperture is smaller than the opening.

11. The device of claim 8, wherein the aperture defined by the first portion and the second portion of the lateral member is parallel to a plane defined by engagement of the upwardly extending wall with the display screen when the bottom portion is rested on the display screen.

12. The device of claim 8, wherein the aperture defined by the first portion and the second portion of the lateral member is oriented at an acute angle with respect to a plane defined by engagement of the upwardly extending wall with the display screen when the bottom portion is positioned on the display screen.

13. The device of claim 8, wherein the top portion of the single housing has a pill or cylindrical shape.

14. The device of claim 8, wherein the upwardly extending wall of the bottom portion of the single housing has a conical shape such that a top end of the upwardly extending wall has a smaller diameter than a bottom end of the upwardly extending wall.

15. The device of claim 8, wherein the output surface of the top portion of the single housing is semi-transparent.

16. The device of claim 8, wherein the lens includes a centrally positioned bore.

17. The device of claim 16, wherein the centrally positioned bore is cylindrical.

18. The device of claim 10, wherein the lens and the mirror are spaced apart from the aperture by respective fixed distances inside the single housing.

19. A device for displaying a projected image comprising:
a single housing configured to be placed on a display screen of a mobile device, wherein the single housing comprises:
   a first housing section including:
      a first portion of an upwardly extending wall, and
      a first portion of a lateral member;
   a second housing section including:
      a second portion of the upwardly extending wall, and
      a second portion of the lateral member;
   a top portion formed when the second housing section is secured to the first housing section and having an output surface; and
   a bottom portion formed when the second housing section is secured to the first housing section and comprising:
      the upwardly extending wall having a first end configured to engage the display screen when the single housing is placed on the display screen, wherein the upwardly extending wall defines an opening through which light emitted by the display screen travels when the bottom portion is placed on the display screen; and
      the lateral member extending inward from the upwardly extending wall, wherein the lateral member defines an aperture through which the light emitted by the display screen travels when the bottom portion is positioned on the display screen, wherein the aperture is at an acute angle with respect to the display screen when the bottom portion is positioned on the display screen;
a lens defining a centrally positioned bore, wherein the lens is affixed to the upwardly extending wall of the bottom portion inside the single housing such that a major axis of the lens is at an acute angle with respect to the display screen when the bottom portion is placed on the display screen, wherein the lens is configured to receive and concentrate the light emitted by the display screen when the bottom portion is placed on the display screen; and
a mirror affixed inside the single housing and spaced apart from the lens and the aperture by respective fixed distances inside the single housing, wherein the lens is positioned between the mirror and the opening defined by the upwardly extending wall such that the mirror is configured to reflect the light concentrated by the lens onto the output surface of the single housing to form an image when the bottom portion is positioned on the display screen.

* * * * *